(12) United States Patent
Thorpe

(10) Patent No.: US 8,459,620 B2
(45) Date of Patent: Jun. 11, 2013

(54) SHOCK ABSORBER

(75) Inventor: Richard Thorpe, London (GB)

(73) Assignee: Karbon Kinetics Ltd., London (GB)

( * ) Notice: Subject to any disclaimer, the term of this patent is extended or adjusted under 35 U.S.C. 154(b) by 474 days.

(21) Appl. No.: 12/438,073

(22) PCT Filed: Aug. 28, 2007

(86) PCT No.: PCT/GB2007/003257
§ 371 (c)(1),
(2), (4) Date: Oct. 13, 2010

(87) PCT Pub. No.: WO2008/025976
PCT Pub. Date: Mar. 6, 2008

(65) Prior Publication Data
US 2011/0018227 A1    Jan. 27, 2011

(30) Foreign Application Priority Data

Aug. 30, 2006  (GB) .................................. 0617037.7

(51) Int. Cl.
*B62K 25/04*    (2006.01)
(52) U.S. Cl.
USPC .......................................... 267/201; 280/283
(58) Field of Classification Search
USPC ........................ 280/275, 283, 284; 267/201
See application file for complete search history.

(56) References Cited

U.S. PATENT DOCUMENTS

| | | | | |
|---|---|---|---|---|
| 3,301,335 A * | 1/1967 | Snelling | ...................... | 173/162.1 |
| 3,332,523 A * | 7/1967 | Chambers | ...................... | 188/129 |
| 3,379,317 A * | 4/1968 | Carlson | ........................... | 213/22 |
| 3,751,020 A * | 8/1973 | Kendall et al. | .................. | 267/33 |
| 5,509,674 A * | 4/1996 | Browning | ...................... | 280/276 |
| 6,736,381 B2 * | 5/2004 | Chesne | ........................ | 267/220 |
| 2002/0139905 A1 | 10/2002 | Duncan | | |

FOREIGN PATENT DOCUMENTS

| | | |
|---|---|---|
| DE | 4429427 | 2/1996 |
| FR | 2720712 | 12/1995 |
| FR | 2750393 | 1/1998 |
| GB | 541873 | 12/1941 |

OTHER PUBLICATIONS

International Search Report for PCT/GB2007/003257, dated Jul. 3, 2008.

* cited by examiner

*Primary Examiner* — Kevin Hurley
(74) *Attorney, Agent, or Firm* — Baker Botts L.L.P.

(57) ABSTRACT

There is described a shock absorber strut for a bicycle, comprising a piston (12), a cylinder (13) and a resilient element (20) positioned within the cylinder. The piston extends out of one end of the cylinder, and the other end of the cylinder is closed by a casing made up of two housing halves. Mounting bushings are integrally formed in the housing halves and on the piston end, respectively, for fixing the shock absorber to a bicycle frame. The piston (12) can be withdrawn from the cylinder (13) by a simple tension, without the use of tools.

14 Claims, 5 Drawing Sheets

SHOCK ABSORBER

CROSS-REFERENCE TO RELATED APPLICATIONS

This present application is a national phase of International Application No. PCT/GB2007/003257, filed Aug. 28, 2007, which claims priority to Great Britain Patent Application Serial No. 0617037.7, filed Aug. 30, 2006, the entire contents of which are incorporated by reference herein and from which priority is claimed.

Currently, bicycles are fitted with suspension systems on the front and rear wheels to enhance rider comfort. With regard to rear wheel bicycle suspension systems, a shock absorber is fitted between the un-sprung rear wheel assembly and the sprung main bicycle frame thus isolating the rider from road vibrations. Bicycle shock absorbers generally comprise a cylindrical metal piston that slides axially inside a cylindrical metal outer body. Between the piston and the outer body is a spring typically made of rubber, an elastomeric material, or a traditional metal coil spring, or even an air chamber type spring. Bicycle shock absorbers can also have damping mechanisms, for example of the oil and valve type, fitted to them.

In order to function safely, effectively, and still be durable, low friction bearings are fitted between the piston and the outer body. These bearings allow the piston to slide smoothly without wearing out the piston surface and the bearings also keep the piston aligned correctly within the outer body. Similar low friction bearings are fitted to the end of the piston and to the end of the outer body where the piston and outer body are respectively fixed to the bicycle frame and the rear wheel arm. During normal operation, these end bearings, or bushings as they are commonly called, allow the piston and outer body to swing in a single plane relative to the bicycle frame parts without excessive wear of the piston and outer body.

The problem with traditional shock absorber design is that the many parts required to make them both light in weight and durable have a relatively high manufacturing cost. Manufacturing processes for traditional shock absorbers generally involve metal spinning, turning, milling, honing and grinding. Additionally, expensive surface treatments are required to the piston and outer body, to promote wear resistance. Another limitation of traditional shock absorber designs is that the piston and outer body cannot be separated without specialist tools. This is a drawback when fitted to a foldable frame design as in order to fold the frame, one end of the shock absorber generally has to be detached from the frame or swinging arm. A complicated and expensive detachable swinging joint structure is thus required, and significant time required to remove the shock absorber.

An objective of the present invention is to provide a light weight and low manufacturing cost bicycle shock absorber, reducing the number and manufacturing cost of the parts.

A further objective is to provide a telescopic shock absorber of simple and robust design, wherein the piston and cylinder of the shock absorber are separable without the use of tools.

A further objective is to provide a telescopic shock absorber system for a bicycle, wherein the resilient characteristics of the shock absorber can be adjusted to suit the rider.

A yet further objective is to provide a bicycle frame comprising a main frame part and a swinging rear arm pivotally mounted thereto, and wherein swinging movement of the rear arm relative to the main frame part is controlled by the shock absorber.

A yet further objective is to provide a bicycle comprising a main frame part to which a steerable front wheel is mounted, and a swinging rear arm pivotally mounted to the main frame and to which a rear wheel is mounted, and wherein swinging movement of the rear arm relative to the main frame part is controlled by the shock absorber.

According to a first aspect of the present invention, there is provided a shock absorber assembly comprising a tubular cylinder, an outer casing enclosing at least one end of the cylinder, a piston removeably receivable in the other end of the cylinder for axial sliding movement relative thereto, and a resilient element positioned within the cylinder and adapted to engage an axial end of the piston within the cylinder, and to transmit an axial force from the piston to the outer casing.

A second aspect of the present invention provides a shock absorber system, comprising the shock absorber assembly and a plurality of resilient elements, selectively mountable in the cylinder of the shock absorber assembly.

A third aspect of the invention provides a bicycle frame in which a main frame part and a rear swinging arm are pivotally connected together, and a shock absorber as described above is mounted to the main frame and to the swinging arm to control relative movement therebetween.

A fourth aspect of the invention provides a bicycle frame system comprising a bicycle frame in which a main frame part and a rear swinging arm are pivotally connected together, a shock absorber as described above mounted to the main frame and to the swinging arm to control relative movement therebetween, and a plurality of resilient elements, selectively mountable in the cylinder of the shock absorber assembly.

A fifth aspect of the invention provides a bicycle having a main frame part to which a steerable front wheel is mounted, and a swinging rear arm pivotally mounted to the main frame and to which a rear wheel is mounted, and a shock absorber as described above mounted to the main frame and to the swinging arm to control relative movement therebetween.

A sixth aspect of the invention provides a bicycle system comprising a bicycle having a main frame part to which a steerable front wheel is mounted, and a swinging rear arm pivotally mounted to the main frame and to which a rear wheel is mounted, a shock absorber as described above mounted to the main frame and to the swinging arm to control relative movement therebetween, and a plurality of resilient elements, selectively mountable in the cylinder of the shock absorber assembly.

By combining the low-friction bearings, end bushing bearings, and the sliding piston into one part, the manufacturing costs of the shock absorber are greatly reduced. In one embodiment, webbing geometry is used in the design of the piston to maintain a largely cylindrical piston profile, and low cost injection moulding can be used for manufacturing. In this embodiment, the piston is formed from a diametral web and a number of parallel spaced flanges extending longitudinally of the piston, the widths of the flanges differing so that, in end view, the piston has a circular profile.

The separable piston and outer body may be provided with alignable anti-theft holes, through which a bicycle lock can be inserted and secured, in order to prevent separation of the two parts of the shock absorber and to provide a location to which a bicycle lock may be secured on or to the bicycle.

In the preferred embodiment, the combined bearing and piston does not require the fitting of a separate low-friction sliding bearing between the piston and the cylinder, nor does it require a low-friction bearing to be fitted to the end of the piston or to the end of the outer body for rotational mounting to the bicycle frame.

This combined bearing piston is preferably manufactured as a single part from a non-metallic material exhibiting both high strength and low-friction properties. The design and geometry of the combined bearing piston may have a largely cylindrical design made possible by a webbed construction making it suitable for low cost injection moulding.

The outer body of the shock absorber is preferably of a clam shell design with left and right halves that are fastened together and around the cylinder by a plurality of fasteners such as bolts or rivets, or by means of bonding or welding techniques. The claim shell outer body permits a more visually appealing shape to be applied to the shock absorber, whilst still offering low manufacturing cost, and efficient transmission of load forces from the piston through the spring member contained in the metal tube and to the outer body fixed to the bicycle frame.

The combined bearing piston and outer body may be separated. This can be advantageous when the shock absorber is fitted to foldable or demountable bicycle frame designs. An additional feature of the combined bearing piston and outer clam shell body is the benefit of being able to lock the separable parts together by inserting a pin, such as that found on a standard bicycle lock, through alignable holes in the piston and the outer clam shell body.

An embodiment of the invention will now be described with reference to the accompanying drawings in which.

Figure 1:
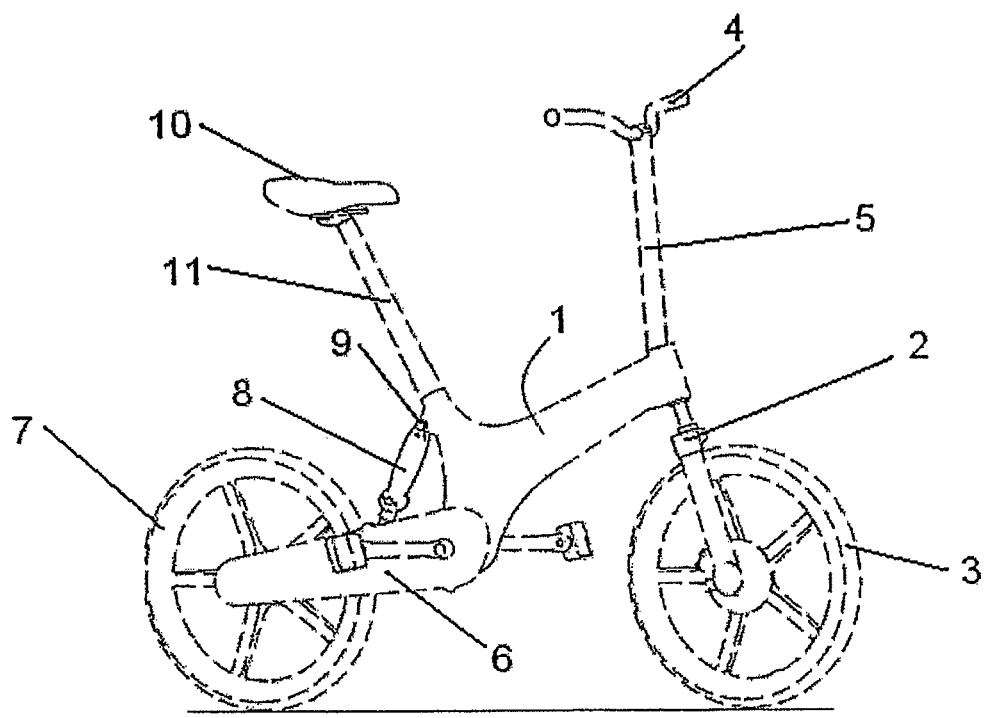
FIG. 1 is a perspective view of the shock absorber mounted to a bicycle.

Referring now to the drawings, FIG. 1 shows a bicycle 1 incorporating the shock absorber assembly of the invention. The bicycle comprises a main frame 1, to which is mounted a front fork assembly 2 carrying a front wheel 3. The front fork assembly 2 is connected to handle bars 4 via a steering stem 5. A rear swinging arm 6 is pivotally mounted to the main frame 1, and carries a rear wheel 7. The shock absorber assembly 8 extends between an upper mounting point 9 on the main frame 1, and a lower mounting point (34 in FIG. 5) on the swinging arm 6. A saddle 10 is amounted to the main frame 1 by a seat post 11.

Figure 2:
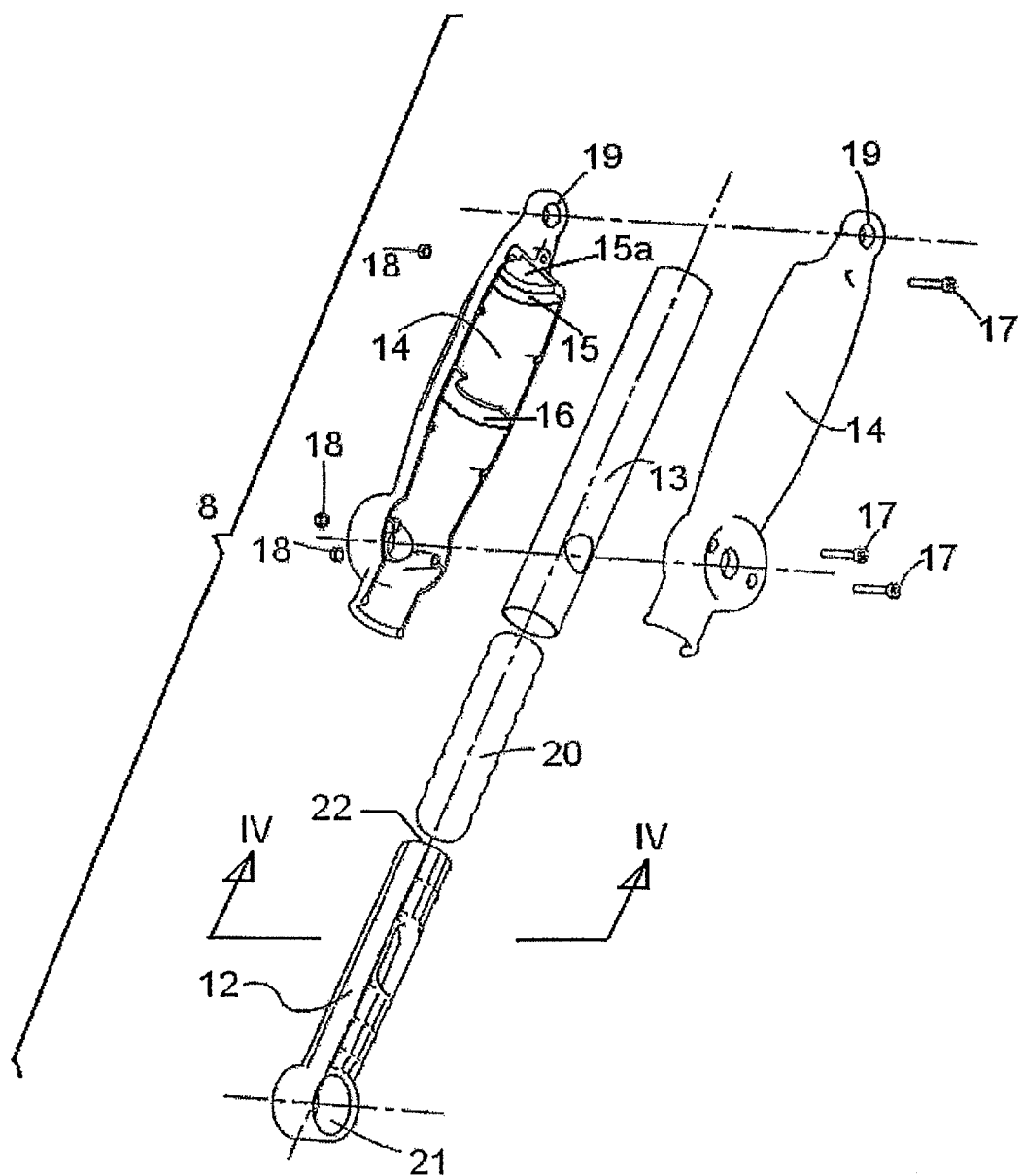
FIG. 2 is a schematic perspective exploded view of the shock absorber.

The shock absorber 8 is shown in greater detail in FIG. 2. The shock absorber comprises a combined bearing piston 12 axially receivable in a tubular cylinder 13 for sliding movement relative to the cylinder 13. The cylinder 13 is held between two housing halves 14, which together form a sleeve having a closed end and an open end. Preferably, the housing halves 14 are made to be identical, in order to reduce manufacturing cost. One end of the cylinder 13 abuts against an engagement surface 15 at the closed end of the sleeve. A central locating rib 16 is provided on the inner surface of each housing half 14, to engage the cylinder 13 intermediate its length, to maintain alignment of the cylinder 13 within the sleeve. The cylinder 13 is located within the outer sleeve, and the housing halves 14 are fastened together by bolts 17 and nuts 18. The housing halves 14 may alternatively be secured together by fasteners such as screws, or by bonding or welding or snap-engaging formations Each of the housing halves 14 has a bush hole 19. The bush holes 19 are coaxially aligned transversely to the axis of the cylinder 13 when the housing halves 14 fitted together, and are adapted to engage a mounting post fitted to a bicycle frame (35 in FIG. 5).

A spring member 20 is housed within the cylinder 13, with one end of the spring member 20 engaging an abutment surface 15a at the closed end of each housing half 14 of the sleeve. Spring member 20 is made of a material that exhibits both springing and damping qualities, and may be an elastomeric material, polyurethane, or a natural or synthetic rubber. In an alternative embodiment, the spring member 20 may be a metallic coil spring. In a yet further alternative embodiment, the spring member 20 may be formed from a number of discrete elastomeric components such as a plurality of balls, plugs or discs formed from natural or synthetic rubber. The elastomeric material of the spring element may be selected to have resilience and damping characteristics suited to the frame geometry and the weight of the rider for whose bicycle the shock absorber is intended. For a heavier rider, a spring element of stiffer construction is indicated, whereas for a lighter rider a spring element 20 which is less stiff (ie made from an elastomeric material with a lower hardness) is indicated. In embodiments where the spring element 20 is composed of a plurality of discrete elastomeric components fitted within the cylinder 13, the components may have different hardnesses and may be selected to provide a combination of components of different hardnesses to suit the weight of the rider.

Combined bearing piston 12 is formed at one end with a piston bush hole 21 adapted to engage a mounting post 34 attached to a bicycle frame. The piston 12 is dimensioned so as to be an easy sliding fit within the cylinder 13, and the end of the piston 12 remote from the bush hole 21 is formed as an abutment surface 22 for engaging the spring element 20. Piston 12 is preferably made from a material that exhibits both high strength and low friction qualities, such as glass-filled nylon, optionally further including friction reducing additives such as PTFE. Piston 12 may alternatively be formed from a metal alloy, such as high-strength aluminium. Piston 12 is preferably formed by injection moulding or die-casting.

In order to assemble the shock absorber, the spring element 20 is first placed within the cylinder 13, and the cylinder 13 is then laid into one of the housing halves 14 with an end of the cylinder 13 engaging the abutment surface 15 at the closed end of the housing half. The second housing half is then placed over the cylinder, and the two housing halves are joined by the nut and bolt fastenings 17, 18. The end surface 22 of the piston 12 is then introduced into the end of the cylinder 13, through the open end of the sleeve formed by the two housing halves 14. The bush holes 19 and at the ends of the shock absorber may then be mounted to the frame and the rear swinging arm, respectively, of a bicycle to form a suspension strut. Axial force applied to the piston 12 via the bush hole is transmitted through the piston to the end surface 22, and is applied to the spring element 20. The compressive force is transmitted through the spring element 22 the abutment surface 15a at the inside of the closed end of the sleeve formed by the two housing halves 14 forces then transmitted to the bush hole is 19 and to the frame of the bicycle, to provide a resilient suspension strut function. The easy sliding fit between the piston 12 and the cylinder 13 enables the piston 12 to be withdrawn from the cylinder 13 by simple tension, allowing the shock absorber to be separated into piston and sleeve parts without the use of tools.

The bicycle illustrated in FIG. 1 has its swinging arm 6 pivotally mounted to the main frame 1, and may be folded for easy transportation by rotating the swinging arm 6 anticlockwise (as seen in FIG. 1) in order to position the rear wheel 7 substantially alongside the front wheel 3. During this operation, the piston 12 of the shock absorber 8 is removed from the cylinder 13, the spring element 20 being retained within the cylinder 13 by frictional engagement. A clip or other fixing may be provided on the swinging arm 6 to hold the piston 12 relative to the swinging arm 6, when the piston is withdrawn from the cylinder 13. Likewise, a clip or other fixing may be provided on the main frame one to secure the sleeve of the shock absorber 8 relative to the main frame 1. Either or both of these clips or fixings may be lockable, so that when the bicycle is in the folded condition one or both of the parts of the shock absorber may be secured to their respective frame section, and reassembly of the bicycle for riding is not possible until both of the shock absorber parts are released from their locks.

The spring element 20 shown in the figures is a substantially cylindrical elastomeric member provided with a series of circumferential grooves. The diameter of the spring element 20 is such that it is in frictional engagement with the interior surface of the cylinder 13 even when uncompressed, and particularly at the areas between the grooves. The grooves provide a radial clearance to enable the elastomeric member to be axially compressed against its own resilience, while being contained within the cylinder 13. In alternative embodiments, the spring element may comprise two shorter cylinders, and the hardness of the two cylinders may be different, to revive the different springing characteristics to the bicycle. The spring elements 20 may be polygonal or cruciform in cross-section so as to engage the interior of the cylinder at a number of longitudinally-extending the lines of contact, or may be cylindrical with a spiral groove extending along the outer surface, to provide radial clearance for compression of the elastomeric material of the spring element. The contact between the spring element and the cylinder maintains the spring element coaxial with the cylinder, while the piston 12 is applying an axial compression to the spring element It is foreseen that the product may be marketed as a shock absorber system comprising the sleeve, the cylinder, the piston, and a plurality of spring elements which are selectively assembled in the cylinder, in accordance with the geometry of the bicycle and the weight of the rider in the final intended use of the shock absorber. For a predetermined bicycle geometry, one or more spring elements 20 may be selected from a plurality of spring elements of differing lengths and hardnesses, in order to provide a desired suspension characteristic. The plurality of spring elements may be colour-coded in correlation to the hardness of the material used in the spring elements, to enable simple selection by a user of the correct combination of spring elements.

A bicycle may be initially supplied to the user with no resilient element 20 mounted in the shock absorber, but the bicycle will then be accompanied by a plurality of shock absorber spring elements of different lengths and resilient characteristics, and a table or other instruction sheet indicating the resilient elements which are to be used in dependence on the weight of the rider. For example, a table may be provided with a number of different weight ranges for the rider, and for each weight range a combination of resilient elements may be identified for insertion into the cylinder 13 of the shock absorber. Once the rider's weight has been determined, the appropriate resilient element or elements are selected, and inserted into the cylinder 13 through the open end of the sleeve. The piston 12 is then introduced into the cylinder, and the swinging arm 6 of the bicycle brought to the riding position so that the resilient elements are compressed between the free end 22 of the piston, and the abutment surface 15a of the housing halves 14.

Figure 3:
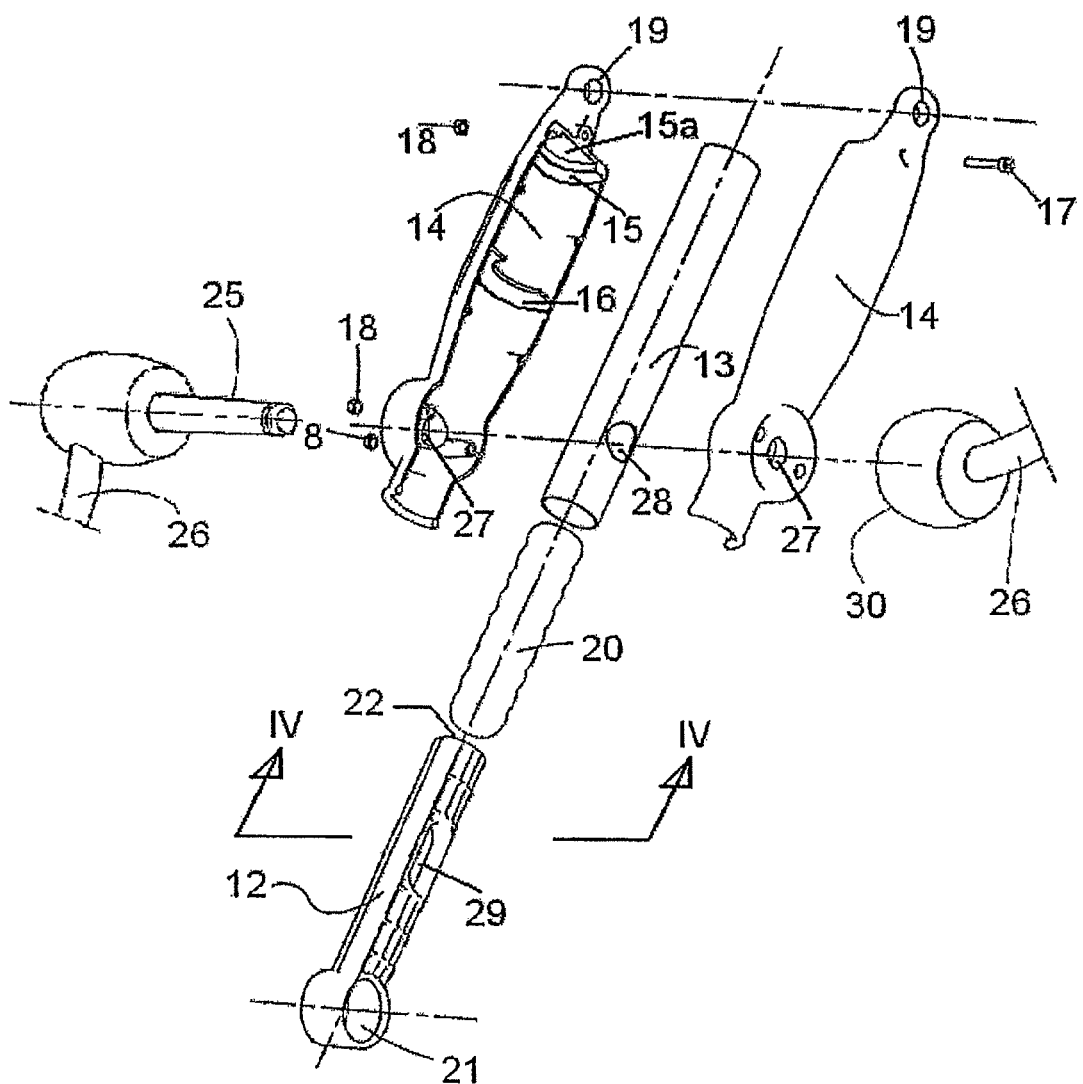
FIG. 3 is a schematic perspective exploded view showing the shock absorber fitted with a bicycle lock.

FIG. 3 is a perspective view similar to FIG. 2, showing how a bicycle lock pin 25 fitted with bicycle lock cable 26 can be fitted to the shock absorber. In this embodiment, aligned lock holes 27 are formed in the respective housing halves 14 of the sleeve, and the cylinder 13 is formed with an aligned transverse bore 28. Piston 12 is also provided with a transverse slot 29, which is aligned with the holes 27 and bore 28 when the piston is in its assembled position. In order to secure the cable 26 to the shock absorber, the lock pin 25 is passed through the aligned lock holes 27, born 28 and slot 29, and a locking element 30, preferably attached to the other end of cable 26, is then releaseably locked on to the free end of pin 25. The slot 29 has an axial extent along the piston such that the normal movement of the piston axially within the cylinder 13 while the bicycle is being ridden is not impeded, so the lock it can be left in position during use of the bicycle. When the rider wishes to secure the bicycle, the rider releases the locking element 30 from the end of pin 25, and passes it through railings or round a fixed object such as a lamp post, and then re-attaches the locking element 32 the pin 25.

The locking arrangement of FIG. 3 may also be used to prevent the bicycle from being ridden, if the locking pin 25 is removed from the shock absorber, the piston 12 is withdrawn from the cylinder 13, and the locking pin 25 is then replaced and locked in position with the pin extending through the housing halves 14 and the cylinder 13. As will be appreciated, only the tip of the piston 12 may then be inserted into the cylinder 13, and the shock absorber will be unsustainably secured in an extremely extended position which will render the bicycle unrideable due to the change in its steering geometry and the risk of collapse of the shock absorber. Optionally, a plug may be secured in place in the cylinder 13 by the locking pin 25, in order to prevent the piston 12 from being reintroduced into the cylinder at all.

Figure 4:
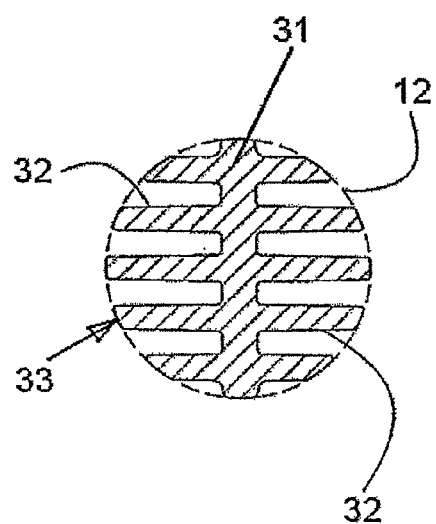
FIG. 4 is a schematic transverse section of the piston, in plane IV-IV of FIG. 2.

FIG. 4 shows a cross section through combined bearing piston 12. Combined bearing piston 12 has a generally cylindrical shape, and as seen in FIG. 4 comprises a substantially vertical central web 31 from which five horizontal flanges 32 of varying widths extent, the end surfaces 33 of the flanges 32 defining a cylindrical outline to the piston 12. This construction makes combined bearing piston 12 suitable for manufacture by injection moulding or die-casting.

Figure 5:
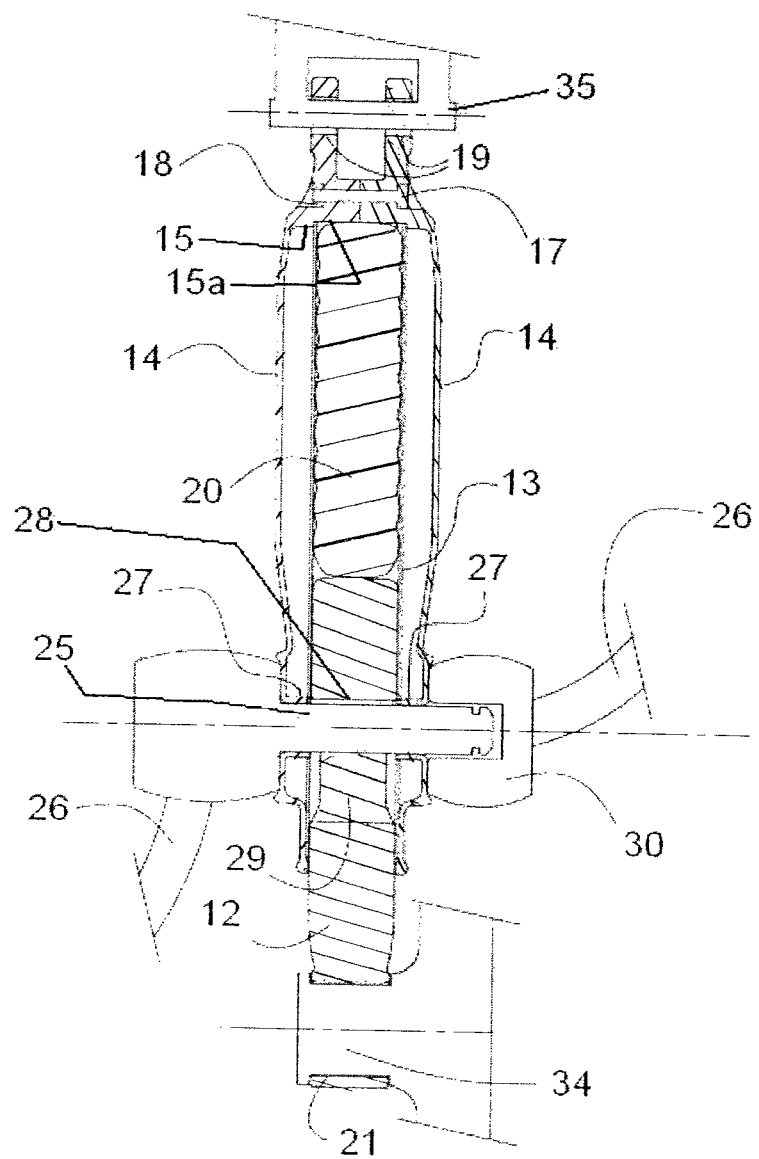
FIG. 5 is a schematic longitudinal cross section of the shock absorber as assembled for normal operation.

FIG. 5 shows a longitudinal cross section of the shock absorber assembled for normal operation. Combined bearing piston 12 has its bearing bush 21 attached to a bicycle frame mount 34 on the swinging arm 6. Road vibration forces are transmitted to combined bearing piston 12 by bicycle frame mount 34 acting on piston bush hole 21. Combined bearing piston 12 transfers road vibration forces to spring member 20 which is radially constrained within cylinder 13, and thus the road vibration forces are transmitted through spring member 20 directly to the abutment surfaces 15a of the housing halves 14, and thence to the respective bush holes 19. An upper mounting 35 fitted to the bicycle frame 1 engages the bush holes 19, to transmit force to the bicycle frame.

Housing halves 14 are held together by the bolts and nuts 17, 18, and rigidly support the cylinder 13. The low-friction properties of piston 12 allow piston 3 to reciprocate axially within cylinder 13 without causing excessive surface wear of the cylinder. The preferred material construction of cylinder 13 is a metal alloy with a hardened surface, preferably the cylinder is made from an aluminium alloy and has its surface anodised for wear resistance. The fit condition between piston 12 and cylinder 13 is such as to allow free axial movement with minimal friction and minimal lateral movement of piston 12 relative to cylinder 13.

While the shock absorber of the present embodiment has been shown fitted to a bicycle with a single rear swinging arm, it is to be understood that the shock absorber may be fitted to any bicycle having rear suspension and requiring a telescopic shock absorber suspension strut.

The invention claimed is:

1. A shock absorber assembly comprising:
   a tubular cylinder open at both of its axial ends;
   an outer casing comprising two casing halves that are fastened together to form a sleeve surrounding the cylinder, the outer casing comprising an abutment surface closing one axial end of the cylinder, and the outer casing comprising an open end aligned with the other end of the cylinder;
   a piston removeably receivable in the other axial end of the cylinder for axial sliding movement relative thereto, the piston comprising a central web and a plurality of flanges extending from the web; and
   a resilient element positioned within the cylinder to engage an axial end of the piston within the cylinder, and to transmit an axial force from the piston to the outer casing by the resilient element abutting the abutment surface of the outer casing.

2. A shock absorber assembly according to claim 1, wherein the resilient element is a substantially cylindrical elastomeric member formed with a series of circumferential grooves.

3. A shock absorber assembly according to claim 2, wherein the resilient element comprises two or more separate elastomeric components.

4. A shock absorber assembly according to claim 3, wherein the hardnesses of the two elastomeric components are different.

5. A shock absorber assembly according to claim 2, wherein the resilient element is at least one of polygonal or cruciform in cross-section.

6. A shock absorber assembly according to claim 2, wherein the resilient element is cylindrical with a spiral groove extending along an outer surface.

7. A shock absorber assembly according to claim 2, wherein the resilient element comprises at least one of an elastomeric material, polyurethane, or a natural or synthetic rubber.

8. A shock absorber assembly according to claim 1, wherein the housing halves are fastened together by a plurality of fasteners including at least one of bolts, rivets, or by means of bonding or welding techniques.

9. A shock absorber assembly according to claim 1, wherein the piston and outer casing are provided with alignable holes, through which a locking pin can be inserted and secured.

10. A shock absorber system, comprising:
    a shock absorber assembly according to claim 1, and
    a plurality of resilient elements, selectively mountable in the cylinder of the shock absorber assembly.

11. A bicycle frame, comprising:
    a main frame part and a rear swinging arm pivotally connected together, and a shock absorber according to claim 1 mounted to the main frame and to the rear swinging arm to control relative movement therebetween.

12. A bicycle frame system comprising:
    a bicycle frame in which a main frame part and a rear swinging arm are pivotally connected together;
    a shock absorber according to claim 1 mounted to the main frame and to the swinging arm to control relative movement therebetween; and
    a plurality of resilient elements, selectively mountable in the cylinder of the shock absorber assembly.

13. A bicycle comprising: a main frame part to which a steerable front wheel is mounted, and a swinging rear arm pivotally mounted to the main frame and to which a rear wheel is mounted, and a shock absorber according to claim 1 mounted to the main frame and to the swinging arm to control relative movement therebetween.

14. A bicycle system comprising:
    a bicycle having a main frame part to which a steerable front wheel is mounted, and a swinging rear arm pivotally mounted to the main frame and to which a rear wheel is mounted;
    a shock absorber according to claim 1 mounted to the main frame and to the swinging arm to control relative movement therebetween; and
    a plurality of resilient elements, selectively mountable in the cylinder of the shock absorber assembly.

* * * * *